といった。

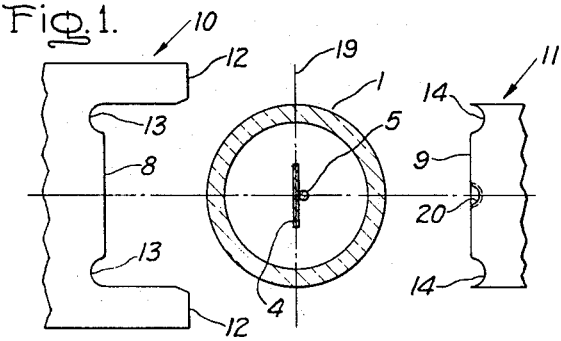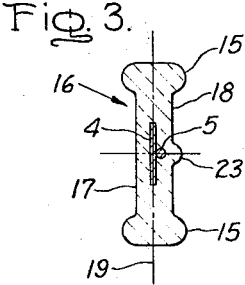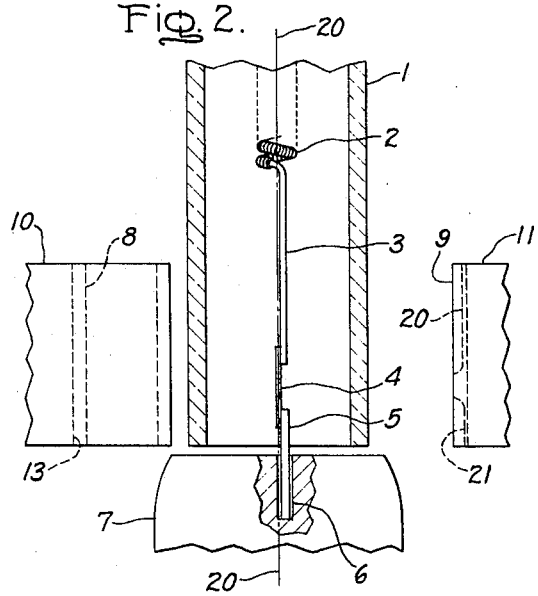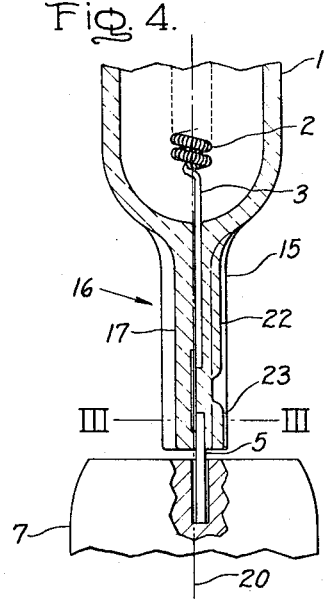

United States Patent Office 3,548,245
Patented Dec. 15, 1970

3,548,245
QUARTZ-TO-METAL FOIL PINCH SEAL
William S. Biscoff, South Euclid, Ohio, assignor to General Electric Company, a corporation of New York
Filed Feb. 13, 1969, Ser. No. 798,928
Int. Cl. H01j 5/50
U.S. Cl. 313—331         3 Claims

ABSTRACT OF THE DISCLOSURE

In a pinch seal at an end of a quartz envelope and enclosing a metal foil having outer and inner lead wires welded to opposite ends thereof and projecting, respectively, outwardly of the seal and inwardly of the envelope, at least the outer lead wire is offset from a plane located precisely at the center of the pinch between and parallel to the flattened surfaces thereof, and the foil is located in said plane, thereby avoiding destruction of the connection of the foil to the lead wire due to distortion of the foil by the flow of the viscous quartz as it wraps around the lead wire.

BACKGROUND OF THE INVENTION

The invention relates generally to quartz-to-metal seals for electrical devices such as electric lamps, and more particularly to pinch seals enclosing a conductor comprising a hermetically sealed thin foil of refractory metal having outer and inner lead wires united to opposite ends thereof.

In certain applications, especially in the case of incandescent lamps drawing heavy currents, for example of the order of 20 amperes or so, there have been numerous failures in continuity of the lead wires, particularly in the connection between the foil and the outer lead wire.

SUMMARY OF THE INVENTION

It is an object of this invention to greatly minimize or eliminate seal failures of the type referred to above. It was noted that the foils were constantly distorted by being forced around the lead wires, particularly the outer lead wires, during the pinch sealing operation. This distortion often resulted in fractures at the point of maximum bending of the foil. These fractures reduced the cross sectional current carrying area of the foil, and failure of the lamp resulted when the fractured, stretched or distorted foil could no longer carry the required current.

In accordance with the present invention, it was determined that the foil distortion was due to the fact that the outer lead wires were positioned exactly in the center of the pinch which caused the foil to be located off center by an amount equal to the lead wire radius. The foil may be considered to react in a manner analogous to a sail in the wind when the pinch is made, and it follows the flow of hot viscous quartz or fused silica as it wraps around the outer lead wire which is held rigidly in place.

Therefore, the correction of the foil distortion is accomplished, in further accord with the invention, by displacing the outer lead wire to a position off center when the pinch is made. Also, by putting longitudinal cavities in one of the pinch jaws directly over the outer and inner lead wires, the flow of hot quartz is controlled so that the lead wires remain in their off center position and the foil is not distorted.

BRIEF DESCRIPTION OF THE DRAWING

In the drawing,

FIG. 1 is a top plan view of the pinch jaws, with a quartz tubular envelope and lead-in conductor therebetween prior to pinching, and in transverse section through the foil and outer lead wire, the foil being shown greatly exaggerated in thickness;

FIG. 2 is an elevation of the parts of the seal assembly shown in FIG. 1 and further including a portion of a chuck in which the lower lead wire is held;

FIG. 3 is a transverse section through the completed seal along the line III—III in FIG. 4; and FIG. 4 is an elevation, in section, through the completed seal.

DESCRIPTION OF THE PREFERRED EMBODIMENT

Referring to FIGS. 1 and 2 of the drawing, there is shown one end of a lamp assembly comprising a tubular envelope 1 of essentially fused silica, such as quartz or the product known as 96% silica glass and sold under the name Vycor. The tube 1 contains a longitudinally extending tungsten wire filament 2, here illustrated as a helical coiled-coil, and connected at each end to a lead-in conductor assembly comprising an inner lead wire 3, preferably of tungsten, welded to one end of an extremely thin foil 4, preferably of molybdenum which may have a thickness of about .0005 to .0017 inch, and which has welded to its other end an outer lead wire 5 which may be of molybdenum. The lead wire assembly is supported from the upper end of the tube 1 in known manner by a suitable stopper member, or by a previous pinch sealing of that end of the tube.

The outer lead wire 5 is rigidly held in a close-fitting bore or passage 6 in a chuck member 7 in which it is usually clamped, for example by a spring-loaded finger member (not shown), with the filament 2 held in a slightly stretched condition. The envelope 1 is heln in any suitable manner with its lower end spaced slightly from the upper surface of the chuck 7 and with a nonoxidizing or reducing gas flowing therethrough to minimize or avoid oxidation of the metal filament and lead-in conductors during the heating and sealing of the end of the tube 1. The lower end of tube 1 is heated to a plastic condition by strong oxyhydrogen burners (not shown) directed thereat from opposite sides of the plane containing the foil 4.

The tube 1 is also held to be midway between the working faces 8 and 9 of respective pinch jaws 10 and 11 which are here illustrated as a so-called confined type wherein jaw 10 is provided with projections 12 which snugly receive the width of the jaw 11 therebetween so that the plastic quartz of tube 1 is confined therebetween laterally on all four sides. The working faces 8 and 9 of jaws 10 and 11 are preferably provided with longitudinal opposed grooves 13 and 14 at their ends to accommodate the excessive plastic quartz thereat and form the rail portions 15 (FIG. 3) of an I-shaped pinch 16 which has flattened surfaces 17 and 18 at opposite sides of a plane located between and parallel to said surfaces 17 and 18, and perpendicular to the plane of the paper through line 19 in FIGS. 1 and 3, and line 20 in FIGS. 2 and 4.

It had been the practice heretofore to support the outer lead wire 5 so that it, as well as inner lead 3, was exactly in the center of the pinch, along the line 20 in FIG. 2. The flow of the plastic viscous quartz wrapped the foil 4 around the leads, especially the outer lead 5 which was held rigid in the chuck 7. It also deformed the foil longitudinally by pushing the part between the leads 3 and 5 over the ends and into alignment with said leads. The distortion often fractured the foil, especially the portion thereof bent around the outer lead wire 5, and the resulting reduced cross sectional current-carrying area of the foil caused failure of the lamp when the fractured, stretched or distorted foil could no longer carry the required current.

In accordance with the present invention the difficulty is solved by positioning the outer lead 5 off center by an amount approximately equal to the lead wire radius, as is shown in FIG. 2 by the position of the bore or passage 6 offset from the center line 20 which is precisely midway between the surfaces 8 and 9 of the pinch jaws 10 and 11 in their closed position. The foil 4 is thereby located precisely midway between the jaws and in the center of the pinch 16 as seen in FIG. 3, and the foil is thereby not distorted. Destruction of the foil is further prevented by preferably providing the face 9 of pinch jaw 11 with longitudinally and centrally extending grooves 20 and 21 which overlie the inner and outer leads 3 and 5, respectively, during the pinching operation, and thereby control the flow of the hot quartz so that the leads remain in their off center position. The grooves 20 and 21 result in the formation of lateral embossments 22 and 23 (FIGS. 3 and 4) which overlie the leads 3 and 5 on the pinch surface 18 toward which the lead wires are displaced.

What I claim as new and desire to secure by Letters Patent of the United States is:

1. In a seal for electrical devices of the type comprising an envelope of essentially fused silica having a flattened pinch seal at an end thereof in which is hermetically sealed a thin refractory metal foil having an outer lead wire of refractory metal united to one end thereof and extending outwardly of the pinch seal and an inner lead wire of refractory metal united to the other end of the foil and extending into the interior of said envelope, the improvement which comprises the location of the foil in a plane which is located essentially precisely at the center of the pinch seal between and parallel to the flattened surfaces thereof, and at least the outer lead wire is offset to one side of said plane a distance sufficient to permit location of the foil in said plane.

2. A seal as defined in claim 1 wherein longitudinal embossments overlie the lead wires on only the one surface of the pinch seal toward which the lead wires are offset.

3. A seal as defined in claim 1 wherein the foil and the outer lead wire are composed of molybdenum.

References Cited

UNITED STATES PATENTS

| | | | |
|---|---|---|---|
| 2,159,794 | 5/1939 | Hagen et al. | 313—331X |
| 3,012,167 | 12/1961 | Poole | 313—331X |
| 3,278,778 | 10/1966 | Retzer | 313—331X |
| 3,351,802 | 11/1967 | Gates | 313—331X |
| 3,351,803 | 11/1967 | Kearney | 313—331 |

JAMES D. KALLAM, Primary Examiner

A. J. JAMES, Assistant Examiner

U.S. Cl. X.R.

65—139; 313—217, 315